United States Patent

Shen et al.

Patent Number: 6,000,876
Date of Patent: Dec. 14, 1999

[54] CONTENT AND PRODUCTION METHOD FOR SEMI-RIGID ASPHALT CONCRETE

[75] Inventors: Der-Hsien Shen, Taipei; Cheng-Tsung Lu, Kaohsiung, both of Taiwan

[73] Assignee: Der-Hsien Shen, Taipei, Taiwan

[21] Appl. No.: 08/893,995

[22] Filed: Jul. 16, 1997

[51] Int. Cl.$^6$ .............................. C08L 95/00; E01C 11/00
[52] U.S. Cl. ............................................. 404/17; 106/278
[58] Field of Search .................................. 404/17, 75, 76; 106/278, 280

[56] References Cited

U.S. PATENT DOCUMENTS

| | | | |
|---|---|---|---|
| 4,094,697 | 6/1978 | Rostler | 404/17 X |
| 4,236,675 | 12/1980 | Bladykas | 404/75 X |
| 5,702,199 | 12/1997 | Fishback et al. | 404/17 |

*Primary Examiner*—Terry Lee Melius
*Attorney, Agent, or Firm*—Harness Dickey & Pierce, P.L.C.

[57] ABSTRACT

A semi-rigid asphalt concrete that can be produced under ambient temperature by applying traditional cement concrete production method. A high temperature heating and great pressure rolling that are necessary for producing asphalt concrete in conventional skills are never being constraints while producing the semi-rigid asphalt concrete. The method of producing the semi-rigid asphalt concrete generates less air pollution than the traditional method for producing hot mix asphalt concrete. The semi-rigid asphalt concrete consists of cationic emulsified asphalt, type-I cement, F-type superplasticizer, Na-Carboxymethyl Cellulose (Na-CMC), calcium chloride($CaCl_2$), stone dust, and III d, IV b, or VII a gradation aggregates. By applying the procedure of producing cement concrete, the semi-rigid asphalt concrete is completely produced after mixing, placing, and curing. The cationic emulsified asphalt and the F-type superplasticizer are first mixed to generate a mixture, and then pour the prepared $CaCl_2$ and Na-CMC solution for continuous mixing. After the mixture is mixing evenly, the cement, stone dust, fine aggregate, and coarse aggregate are sequentially pouring to the mixture for mixing. While the mixture is mixed evenly, the mixture is placing and curing, and it can be used after harden enough.

21 Claims, 7 Drawing Sheets

| Sieve Size | | Amount Retained (wt.%) | | |
|---|---|---|---|---|
| | | IIId | IVb | VIIa |
| Coarse Aggregate | 3/4 in. (19.0mm) | 7.5 | 0.0 | 0.0 |
| | 1/2 in. (12.7mm) | 17.5 | 7.5 | 0.0 |
| | 3/8 in. (9.5mm) | 17.5 | 12.5 | 0.0 |
| | No.4 (4.76mm) | 17.5 | 20.0 | 7.5 |
| Fine Aggregate | No.8 (2.38mm) | 12.5 | 17.5 | 5.0 |
| | No.16 (1.19mm) | 7.5 | 9.5 | 8.0 |
| | No.30 (0.59mm) | 7.5 | 9.5 | 17.0 |
| | No.50 (0.30mm) | 5.0 | 5.5 | 27.5 |
| | No.100 (0.15mm) | 2.5 | 6.0 | 20.0 |
| Stone Dust | No.200 (0.07mm) | 5.0 | 12.0 | 15.0 |

FIG. 1

| Cement | Emulsified Asphalt | Superplasticizer | Fine Aggregate | Coarse Aggregate | Na-CMC | CaCl$_2$ |
|---|---|---|---|---|---|---|
| 1.0 | 0.9 | 0.03 | 0.933 | 1.4 | 0.09 | 0.01 |
| 1.0 | 1.0 | 0.03 | 0.933 | 1.4 | 0.10 | 0.01 |
| 1.0 | 1.1 | 0.03 | 0.933 | 1.4 | 0.11 | 0.01 |

FIG. 3A

| Cement | Emulsified Asphalt | Superplasticizer | Fine Aggregate | Coarse Aggregate | Na-CMC | CaCl$_2$ |
|---|---|---|---|---|---|---|
| 1.0 | 0.9 | 0.03 | 1.4 | 0.933 | 0.09 | 0.01 |
| 1.0 | 1.0 | 0.03 | 1.4 | 0.933 | 0.10 | 0.01 |
| 1.0 | 1.1 | 0.03 | 1.4 | 0.933 | 0.11 | 0.01 |
| 1.0 | 1.2 | 0.03 | 1.4 | 0.933 | 0.12 | 0.01 |

FIG. 3B

| Cement | Emulsified Asphalt | Superlasticizer | Fine Aggregate | Coarse Aggragate | Na-CMC | CaCl$_2$ |
|---|---|---|---|---|---|---|
| 1.0 | 1.2 | 0.03 | 2.15 | 0.175 | 0.12 | 0.01 |
| 1.0 | 1.3 | 0.03 | 2.15 | 0.175 | 0.13 | 0.01 |
| 1.0 | 1.4 | 0.03 | 2.15 | 0.175 | 0.14 | 0.01 |

FIG. 3C

| Semi-Rigid Asphalt concrete | Cement | Emulsified Asphalt | Superlasticizer | Fine Aggregate | Coarse Aggragate | Na-CMC | CaCl$_2$ |
|---|---|---|---|---|---|---|---|
| IIId | 1.0 | 0.9 | 0.03 | 0.933 | 1.4 | 0.09 | 0.01 |
| IVb | 1.0 | 1.0 | 0.03 | 1.4 | 0.933 | 0.10 | 0.01 |
| VIIa | 1.0 | 1.3 | 0.03 | 2.15 | 0.175 | 0.13 | 0.01 |

FIG. 3D

| Mixtures | Immersed Water Residual Strength | Deformation of Wheel Tracking |
|---|---|---|
| Semi-Rigid Asphalt Concrete III d | 89.24% | 0.43 mm |
| Semi-Rigid Asphalt Concrete IV b | 88.78% | 1.12 mm |
| Semi-Rigid Asphalt Concrete VII a | 97.12% | 1.36 mm |
| Hot Mix Asphalt Concrete IV b | 75% | 7.25 mm |
| ※ Remarks | Ratio of immersed water 60°C and non-immersed water | 7 days curing time, use 60°C temperature and 19.4 kg/cm$^2$ pressure to test 2000 times |

FIG. 5

| Mixtures | Semi-Rigid Asphalt Concrete | | | Portland Cement Concrete |
|---|---|---|---|---|
| Gradation | III d | IV b | VII a | Rigid Pavement |
| Slump (cm) | 4~9 | 6~12 | 8~13 | 3~8 |

FIG. 6

| Mixtures | Portland Cement Concrete | | | Semi- Rigid Concrete | | Asphalt | Hot Mix Asphalt Concrete | | |
|---|---|---|---|---|---|---|---|---|---|
| | III d | IV b | VII a | III d | IV b | VII a | III d | IV b | VII a |
| Gradation | | | | | | | | | |
| Stability Value 7 days, kg | - | - | - | 2716 | 2528 | 1934 | 1075 | 1724 | 1357 |
| Compressive Strength 28 days, kg/cm² | 424 ~ 437 | 393 ~ 414 | 293 ~ 342 | 76 ~ 107 | 70 ~ 76 | 62 ~ 70 | 20 ~ 28 | | |
| Tensile Strength 7 days, kg/cm² | 29 | 27 | 21 | 8.47 | 9.62 | 5.45 | | 2.82 | |
| Flexural Strength 7 days, kg/cm² | 48 | 45 | 35 | 21.66 | 21.78 | 14.29 | | 12.27 | |
| Deformation of Wheel Tracking 7 days, 0.01mm | Loading: 19.4 kg/cm² Temperature: 60°C Times : 2000 no deformation | | | 43 | 112 | 136 | 725 | | |
| Modulus of Elasticity 28 days, kg/cm² | 21100 | | | 5734 ~ 7753 | 7033 ~ 7661 | 5734 ~ 7753 | 4500 ~ 5500 | | |
| Rebound Number 28 days | 24 ~ 34 | | | 18 | 18 | 24 | 12 ~ 20 | | |

FIG. 7

CONTENT AND PRODUCTION METHOD FOR SEMI-RIGID ASPHALT CONCRETE

BACKGROUND OF THE INVENTION

1. Field of the Invention

The present invention relates to a semi-rigid asphalt concrete, which is made by applying the procedure of producing cement concrete, and the semi-rigid asphalt concrete is completely produced after mixing, placing, and curing. And more specifically, the present invention relates to a method for improving the prior art for paving by asphalt concrete without using the steps of high temperature heating and great pressure rolling necessitated by the prior art.

2. Description of the Prior Art

Transportation and trucks' loading keep growing up as industries go on developing, which increases loading of road pavements. An often used conventional skill is to apply hot mix asphalt concrete for paving. By using great pressure rolling and a layer-by-layer scheme, the asphalt concrete is pressed solidly as achieving expectant strength. Any pavement formed from the above scheme is named as flexible pavements, which is tender enough for those who driving cars to feel comfortable. Because the flexible pavement has disadvantages such as deformation, cracking or slipping by great pressure of wheel tracking, the structure of the flexible pavement is easily destroyed.

Another technology applies cement concrete for paving, which is named as rigid pavement. The cement concrete provides higher strength than the conventional asphalt concrete in deformation resistance from wheel tracking. Because the strength and the rigidity of the cement concrete are stronger than the asphalt concrete's, it implies the cement concrete makes drivers to feel less comfortable than the asphalt concrete does. In addition, a higher cost and more difficult technologies are needed for construction. Otherwise, hard to maintain is another disadvantage of the cement concrete. It also indicates that both of the hot mix asphalt concrete and the cement concrete still need some improvements.

The hot mix asphalt concrete is sometime applied as filler source with additional cement, wherein the quantity of the additional cement must be limited in a weight range of 10% to 15%. Unfortunately, additional strength generated by the additional cement does not significantly increase. The cement has been conventionally applied as additions in the emulsified asphalt concrete in a weight range of 0.5% to 2%. Evaluations from the emulsified asphalt concrete indicate that the stability and the flow of the emulsified asphalt concrete significantly increase. Furthermore, the coating capability of the emulsified asphalt concrete will decrease when the quantity of the cement increases.

Although the additional cement can enhance a little stability and strength of the asphalt concrete, it will degrade the filling effect of the fine aggregate when the cement is hydrated. The voids of the asphalt concrete will increase, and thus degrade resistance to water immersing. Therefore, some further improvements to those traditional paving schemes become an eager desire.

SUMMARY OF THE INVENTION

The principal object of the present invention is to propose a semi-rigid asphalt concrete with its component ratios for applying in pavement engineering.

The other object of the invention is to provide a method which utilizes the cement concrete pavement construction equipment and the ready-mixed concrete plant to provide the semi-rigid asphalt concrete.

The semi-rigid asphalt concrete is composed of cationic emulsified asphalt, type-I cement, F-type superplasticizer, Na-Carboxymethyl Cellulose (Na-CMC), calcium chloride ($CaCl_2$), stone dust, and III d, IV b, or VII a gradation aggregates as sources. By applying the procedure of producing cement concrete, the semi-rigid asphalt concrete is completely produced after mixing, placing, and curing.

Key function of stably mixing the semi-rigid asphalt concrete is to apply the F-type superplasticizer being buffer among the emulsified asphalt, the cement, and the aggregates. The buffer also prevents the emulsified asphalt from being reduced to asphalt colloid and water when the emulsified asphalt loses part of water. In accordance with the viscousness which depends on the water contained in the cement asphalt colloid, the semi-rigid asphalt concrete can be prevented from decomposing by controlling the quantity of the buffer.

The method of producing the semi-rigid asphalt concrete also generates less air pollution than the traditional that produces the hot mix asphalt concrete. First, the cationic emulsified asphalt and the F-type superplasticizer are first mixed to produce a mixture, and then the prepared $CaCl_2$ and Na-CMC solution are poured for continuous mixing. After the mixture is mixing evenly, the cement, the stone dust, the fine aggregate, and the coarse aggregate are sequentially pouring to the mixture for mixing. Placing and curing the mixture, after it is mixed evenly again. The mixture could not be utilized until it is hard enough.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 represents a table for describing component ratios about the fine and coarse aggregates of III d, IV b, or VII a gradation;

FIG. 3A illustrates the workable component weight ratios of the III d gradation;

FIG. 3B describes the workable component weight ratios of the IV b gradation;

FIG. 3C represents the workable component weight ratios of the VII a gradation;

FIG. 3D is the optimal component weight ratios of the semi-rigid asphalt concrete;

FIG. 5 is a table for comparing stability between the semi-rigid asphalt concrete and the hot mix asphalt concrete;

FIG. 6 is a table for slump evaluations between the semi-rigid asphalt concrete and the hot mix asphalt concrete; and FIG. 7 lists a table for comparing the strength among the semi-rigid asphalt concrete, the hot mix asphalt concrete, and Portland cement concrete.

DESCRIPTION OF THE PREFERRED EMBODIMENT

Basic components of the semi-rigid asphalt concrete according to the present invention are cationic emulsified asphalt, type-I cement, F-type superplasticizer, Na-Carboxymethyl Cellulose (Na-CMC), calcium chloride ($CaCl_2$), stone dust, and III d, IV b, or VII a gradation aggregates.

The type-I cement is not only the main source of the congelation strength, but has capability of moderating the viscosity of the semi-rigid asphalt concrete. Ratios of the fine and coarse aggregates of the III d, IV b, and VII a gradations are listed in FIG. 1. Stone dust is extremely finer drops generated from a crushing or mixing plant. As custom of applying the hot mix asphalt concrete, the stone dust is a fine aggregate passing a sieve of No. 100. In addition, the III d gradation corresponds ¾ inches' gradation of ASTM (American Society for Testing and Materials) D3515, the IV b gradation matches ½ inches' gradation of ASTM D3515, and the VII a gradation corresponds a sand asphalt gradation of ASTM D3515. The ASTM D3515 matches the standard specification for hot-mixed, hot-laid bituminous paving mixtures.

The F-type superplasticizer acts as surfactant, which is a very important element in a mixing procedure. Because the F-type superplasticizer is a buffer among the emulsified asphalt, the cement, and the aggregates, it prevents the emulsified asphalt from being separated into asphalt colloid and water when the emulsified asphalt loses parts of free water. The suspension liquid of the processed emulsified asphalt can be mixed with the cement and the aggregates by using external pressure. A high quality of the semi-rigid asphalt concrete can thus be produced.

In a accordance with the viscousness which depends on the water contained in the cement asphalt colloid, decomposition of the semi-rigid asphalt concrete can be prevented by controlling the quantity of the F-type superplasticizer. This characteristic also prevents the semi-rigid asphalt concrete from being interfered by viscosity while mixing.

Figure 2:
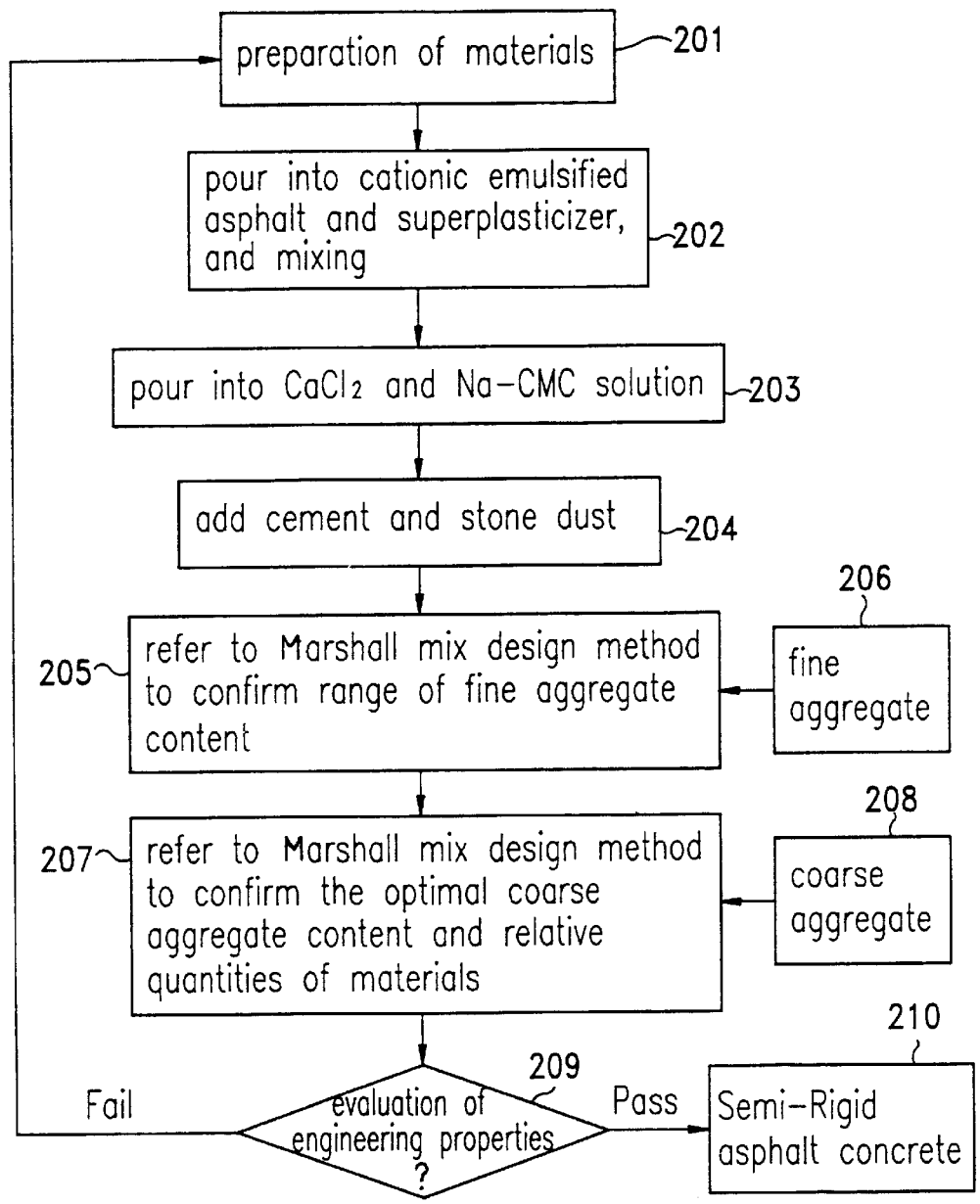
FIG. 2 is a flow chart representing a design procedure for obtaining the workable component distribution of the semi-rigid asphalt concrete.

FIG. 2 is a flow chart representing a procedure for obtaining the workable component distribution of the semi-rigid asphalt concrete. After preparing all materials (step 201), the ratios of the emulsified asphalt and the F-type superplasticizer are decided by referring to Marshall mix design method. Both the emulsified asphalt and the F-type superplasticizer are poured into mixing device for mixing (step 202). When mixing evenly, the ready surfactant composed of $CaCl_2$ and Na-CMC are poured into the mixture produced in the step 202 (step 203). After mixing evenly, the cement and the stone dust are then poured into the mixture, and the mixture then becomes cement asphalt colloid (step 204). Ratios the emulsified asphalt and the cement can be decided by the fluidity and the required compressive strength of the cement asphalt colloid. The fine aggregates of gradation are poured into the mixture of the cement asphalt colloid after mixing evenly (step 206). By using a Marshall mix design method, an asphalt mortar can be produced and tested for obtaining the ranges of the fine aggregates (step 205). The coarse aggregates of the gradation are then poured into the mixture and mixed evenly again (step 208). The ranges of coarse aggregates also can be obtained by using an asphalt concrete that is generated and tested from the Marshall mix design method (step 207). Finally, a plurality of evaluations to the mixture are performed in kinds of engineer property items (step 209). When the mixture passes the evaluations, the mixture with its component ratios becomes a candidate of the semi-rigid asphalt concrete (step 210). When the mixture does not pass the evaluations, it is necessary to prepare materials for performing the above tests again (return to step 201).

The evaluations mentioned above can be used to decide the component ratios of the F-type superplasticizer, the stone dust, and the cement, etc.. The evaluation items can be divided into mechanics and durability tests. The mechanics tests include nine test items in mechanics properties, such as compressive strength test, Marshall stability value test, indirect tensile strength test, piercing shear strength test, flexural strength test, deformation of wheel tracking test, rebound number test, and test to residual strength after immersing from water. The durability tests include three aging test, such as heating oven test, freezing and thawing test, and drying and wetting test, etc.. All results of the mechanics and durability tests are entirely evaluated, and all workable component ratios of the materials are concluded in FIG. 3A, FIG. 3B, FIG. 3C, and FIG. 3D. The FIG. 3A, the FIG. 3B, and the FIG. 3C list the workable component ratios of the semi-rigid asphalt concrete according to the III d gradation, the IV b gradation, and the VII a gradation, respectively. The optimal component ratios of the III d, IV b, and VII a gradations are listed in the FIG. 3D, which are most superior from the entirely evaluations among the above-mentioned tests.

From the FIGS. 3A to 3D, which describe the weight ratios of the components of the semi-rigid asphalt concrete by applying the weight of the type-I cement as basis. For example, the weight of the emulsified asphalt of the III d gradation is about 0.9 times the weight of the type-I cement; and the weight of the F-type superplasticizer is about 0.03 times the weight of the type-I cement in the FIG. 3D. In addition, the weights of the stone dust are about 0.05, 0.12, 0.15 times total weight summation of the coarse aggregate, fine aggregate, and stone dust in the III d, IV b, and VII a gradations, respectively.

Figure 4:
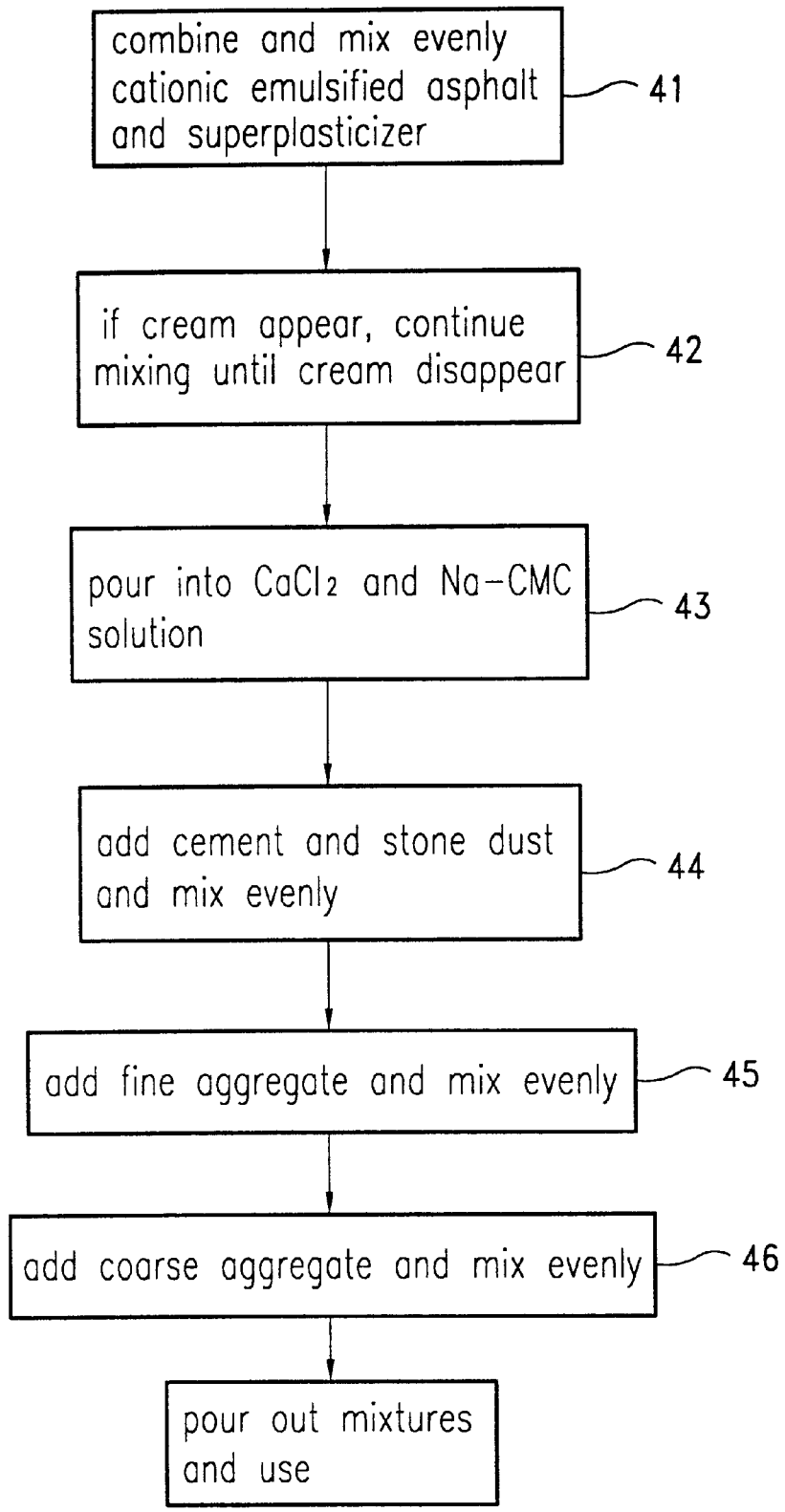
FIG. 4 is a flow chart for representing a production procedure of the semi-rigid asphalt concrete.

FIG. 4 is flow chart for representing the production procedure of the semi-rigid asphalt concrete. The cationic emulsified asphalt and the F-type superplasticizer are combined and mixed evenly (step 41). When cream appears in mixing, the mixing operations must keep continuing until the cream disappears (step 42). After the cream disappearing, the surfactant consisting of the $CaCl_2$ and Na-CMC solutions are then poured into the mixture generated in the step 42, and then go on mixing (step 43). The Na-CMC solution is a concentration about 1% in weight ratio.

While mixing evenly, the cement and the stone dust are then poured into the mixture produced in the step 43 (step 44). After mixing evenly, the fine aggregate is poured into the mixture generated in the step 44 (step 45). The coarse aggregate is then poured into the mixture produced by the step 45 after mixing evenly (step 46). When the mixture is mixed evenly, it can be poured out for placing and curing, and then being used after harden. Constraints from the high temperature heating and the rolling procedure with great pressure are never being essentials in the above-mentioned producing procedure. The semi-rigid asphalt concrete can be produced in ambient temperature, but the sequence of pouring the components must be correct. Otherwise, it is hard to produce a high quality semi-rigid concrete.

FIG. 5 is a table for comparing stability between the semi-rigid asphalt concrete and hot mix asphalt concrete. Because the just produced semi-rigid asphalt concrete contains high quality of denseness, it also contains high qualities of uniformity and stability after placing.

The stability of the semi-rigid asphlat concrete is illustrated by using the table in the FIG. 5. Under the conditions of immersed water 60° C. and 19.4 $kg/cm_2$ pressure, the deformation of the hot mix asphalt concrete in 7 days is 7.25 mm (millimeter), but the deformations of the III d, IV b, or VII a gradations of the semi-rigid asphalt concrete are 0.43 mm, 1.12 mm, and 1.36 mm, respectively. Furthermore, the III d, IV b, and VII a gradations of the semi-rigid asphalt concrete still have about 90% of compressive strength after severe environment, but the hot mix asphalt concrete has only about 75% of compressive strength under the same conditions.

FIG. 6 lists the evaluations from slump tests for comparing performance between the semi-rigid asphalt concrete and the cement concrete. Because the semi-rigid asphalt concrete applies the construction equipment of the rigid pavement, it indicates that the slump must be controlled under 10 cm (centimeter). According to the table of the FIG. 6, the semi-rigid asphalt concrete has better performance than the cement concrete. In addition, the semi-rigid asphalt concrete has the capability of delaying setting time after adding the Na-CMC, which influences initial setting time of the semi-rigid concrete being later than the cement concrete's. It also implies that the semi-rigid asphalt concrete has more flexibility and less slump loses than the cement concrete while transporting. Thus, the semi-rigid asphalt concrete has better performance than the hot mix asphalt concrete and the cement concrete.

FIG. 7 is a table for comparing the strength between the semi-rigid asphalt concrete and the hot mix asphalt concrete. The congelation formed by the cement in the semi-rigid asphalt concrete has the capability of loading support, and the capability of enhancing coherence effect with aggregates. Referring to the FIG. 7, the strength of the semi-rigid asphalt concrete is about 2~3 times the hot mix asphalt concrete, and only uses additional 20% of elasticity modulus as trade-off. Therefore, the semi-rigid asphalt concrete can be a flexible road pavement that is similar to the asphalt concrete for supporting traffic loading.

In addition, the evaluations from the heating oven tests, the freezing and thawing, and the drying and wetting tests indicate that they give little degradation to the semi-rigid asphalt concrete. Because the semi-rigid asphalt concrete is a rich paste concrete with higher qualities in strength, tenderness, and water tightness than the hot mix asphalt concrete, the semi-rigid asphalt concrete does also higher durability than the hot mix asphalt concrete does.

Moreover, the characteristics of the just produced fresh semi-rigid asphalt concrete are quite different with those of the hot mix asphalt concrete but similar to those of the cement concrete. Furthermore, the placing and strength growing methods of the semi-rigid asphalt concrete are also similar to those of the cement concrete. It also indicates that a cement concrete mixer or a mixed plant can be applied in mixing and placing, and a rigid pavement constriction equipment or a cement concrete construction devices can be applied in placing. The semi-rigid asphalt concrete thus receives fewer constraints from topography and climate than the conventional skills. In addition, the semi-rigid asphalt concrete can be applied in road pavements, sidewalks, and parking lots. Furthermore, the improvements of soil, the waterproof of roofs, the guard against slipping pavements of covers, the pavements of sports arenas, and the pavement maintenance engineering can apply the semi-rigid asphalt concrete for construction.

In conclusion, the present invention discloses a semi-rigid asphalt concrete that can be produced under ambient temperature by applying traditional cement production methods and equipment. The high temperature heating and the rolling procedure with great pressure that are essential for producing conventional asphalt concrete are no longer necessary. The method of producing the semi-rigid asphalt concrete also generates less air pollution than the traditional method for producing hot mix asphalt concrete. In addition, the semi-rigid asphalt concrete can be applied in common road pavements, side walks, and parking lots. Furthermore, improvements of soil, waterproofing of roofs, pavements of sports arenas, and pavement maintenance engineering can use the semi-rigid asphalt concrete for construction.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for producing semi-rigid asphalt concrete which comprises cement comprising the steps of:

pouring cationic emulsified asphalt, whose weight is in the range of from 0.9 to 1.1 times said cement, into a mixing device;

pouring superplasticizer, whose weight is about 0.03 times said cement, into said mixing device;

pouring Na-Carboxymethyl Cellulose (Na-CMC), whose weight is in the range of from 0.09 to 0.11 times said cement, into said mixing device;

pouring calcium chloride ($CaCl_2$), whose weight is about 0.01 times said cement, into said mixing device;

adding said cement and stone dust into said mixing device;

mixing said cement and said stone dust with cationic emulsified asphalt, said superplasticizer, said Na-Carboxymethyl Cellulose, and said calcium chloride into a mixture;

adding fine aggregate of III d gradation, whose weight is about 0.933 times said cement, into said mixing device and mixing the fine aggregate with said mixture; and adding coarse aggregate of III d gradation, whose weight is about 1.4 times said cement, into said mixing device and mixing the coarse aggregate with said mixture.

2. The method according to claim 1, wherein said semi-rigid asphalt concrete can be applied in road pavements, sidewalks, pavement of parking lots, improvements of soil, waterproofing of roofs, pavements of sports arenas, or pavement maintenance engineering.

3. The method according to claim 1, wherein said superplasticizer comprises F-type superplasticizer.

4. The method according to claim 1, wherein said cement is ASTM type-I cement.

5. The method according to claim 1, wherein said III d gradation corresponds ¾ inches' gradation of ASTM (American Society for Testing and Materials) D3515, wherein said ASTM D3515 matches a standard specification for hot-mixed, hot-laid bituminous paving mixtures.

6. The method according to claim 1, further comprising a step of adding stone dust into the mixing device after the step of adding cement.

7. The method according to claim 6, wherein the weight of said stone dust is about 0.05 times total weight of summation of said coarse aggregate, fine aggregate, and said stone dust.

8. A method for producing semi-rigid asphalt concrete which comprises cement comprising the steps of:

pouring cationic emulsified asphalt, whose weight is in the range of from 0.9 to 1.2 times said cement, into a mixing device;

pouring superplasticizer, whose weight is about 0.03 times said cement, into said mixing device;

pouring Na-Carboxymethyl Cellulose (Na-CMC), whose weight is in the range of from 0.09 to 0.12 times said cement, into said mixing device;

pouring calcium chloride ($CaCl_2$), whose weight is about 0.01 times said cement, into said mixing device;

adding said cement and stone dust into said mixing device;

mixing said cement and said stone dust with said cationic emulsified asphalt, said superplasticizer, said Na-Carboxymethyl Cellulose, and said calcium chloride into a mixture;

adding fine aggregate of IVb gradation, whose weight is about 1.4 times said cement, into said mixing device and mixing the fine aggregate with said mixture; and adding coarse aggregate of IVb gradation, whose weight is about 0.933 times said cement, into said mixing device and mixing the coarse aggregate with said mixture.

9. The method according to claim 8, wherein said semi-rigid asphalt concrete can be applied in road pavements, sidewalks, pavement of parking lots, waterproofing of roofs, pavement of sports arenas, or pavement maintenance engineering.

10. The method according to claim 8, wherein said superplasticizer comprises F-type superplasticizer.

11. The method according to claim 8, wherein said cement is ASTM type-I cement.

12. The method according to claim 8, wherein said IVb gradation corresponds ½ inches' gradation of ASTM (American Society for Testing and Materials) D3515, wherein said ASTM D3515 matches a standard specification for hot-mixed, hot-laid bituminous paving mixtures.

13. The method according to claim 8, further comprising a step of adding stone dust into the mixing device after the step of adding cement.

14. The method according to claim 13, wherein the weight of said stone dust is about 0.12 times total weight of summation of said coarse aggregate, fine aggregate, and said stone dust.

15. A method for producing semi-rigid asphalt concrete which comprises cement comprising the steps of:

pouring cationic emulsified asphalt, whose weight is in the range of from 1.2 to 1.4 times said cement, into a mixing device;

pouring superplasticizer, whose weight is about 0.03 times said cement, into said mixing device;

pouring Na-Carboxymethyl Cellulose (Na-CMC), whose weight is in the range of from 0.12 to 0.14 times said cement, into said mixing device;

pouring calcium chloride ($CaCl_2$), whose weight is about 0.01 times said cement, into said mixing device;

adding said cement and stone dust into said mixing device;

mixing said cement and said stone dust with said cationic emulsified asphalt, said superplasticizer, said Na-Carboxymethyl Cellulose, and said calcium chloride into a mixture;

adding fine aggregate of VIIa gradation, whose weight is about 2.15 times said cement, into said mixing device and mixing the fine aggregate with said mixture; and adding coarse aggregate of VIIa gradation, whose weight is about 0.175 times said cement, into said mixing device and mixing the coarse aggregate with said mixture.

16. The method according to claim 15, wherein said semi-rigid asphalt concrete can be applied in road pavements, sidewalks, pavement of parking lots, waterproofing of roofs, pavement of sports arenas, or pavement maintenance engineering.

17. The method according to claim 15, wherein said superplasticizer comprises F-type superplasticizer.

18. The method according to claim 15, wherein said cement is ASTM type-I cement.

19. The method according to claim 15, wherein said VIIa gradation corresponds sand asphalt gradation of ASTM (American Society for Testing and Materials) D3515, wherein said ASTM D3515 matches a standard specification for hot-mixed, hot-laid bituminous paving mixtures.

20. The method according to claim 15, further comprising a step of adding stone dust into the mixing device after the step of adding cement.

21. The method according to claim 20, wherein the weight of said stone dust is about 0.15 times total weight of summation of said coarse aggregate, fine aggregate, and said stone dust.

* * * * *